United States Patent [19]

Donnelly et al.

[11] 4,249,696
[45] Feb. 10, 1981

[54] CHARGING CIRCUIT FOR BATTERY IN THERMOSTAT WITH BATTERY OPERATED TIMER

[75] Inventors: Donald E. Donnelly, Edwardsville; Robert C. Krump, Waterloo, both of Ill.

[73] Assignee: Emerson Electric Co., St. Louis, Mo.

[21] Appl. No.: 38,093

[22] Filed: May 11, 1979

[51] Int. Cl.³ ............................ F23N 5/20; H02J 7/00
[52] U.S. Cl. ..................................... 236/46 R; 307/66
[58] Field of Search .................... 236/46 R; 165/12; 307/66; 337/302, 303; 320/51, 57

[56] References Cited

U.S. PATENT DOCUMENTS

| | | | |
|---|---|---|---|
| 3,293,445 | 12/1966 | Levy | 320/57 X |
| 3,711,747 | 1/1933 | Sahara et al. | 307/17 |
| 3,769,571 | 10/1933 | Wilkinson | 320/2 |
| 3,948,441 | 4/1976 | Perkins et al. | 236/46 R |
| 4,177,923 | 12/1979 | Krump | 236/46 R |

OTHER PUBLICATIONS

Honeywell Memo, Exhibit F22, 6/13/63.

*Primary Examiner*—William E. Wayner
*Attorney, Agent, or Firm*—Paul A. Becker, Sr.

[57] ABSTRACT

A timer controlled space thermostat includes a battery operated timer and charging circuit means for continuously charging the battery. The charging circuit means includes a miniature transformer having two primary windings and one secondary winding wound on a single core. When a thermostat switch therein is closed to effect energizing of space conditioning apparatus, one of the primary windings induces a stepped-up voltage and stepped-down current in the secondary winding to effect charging the battery. When the thermostat switch is open, the other primary winding induces a stepped-down voltage and stepped-up current in the secondary winding to effect charging the battery.

2 Claims, 1 Drawing Figure

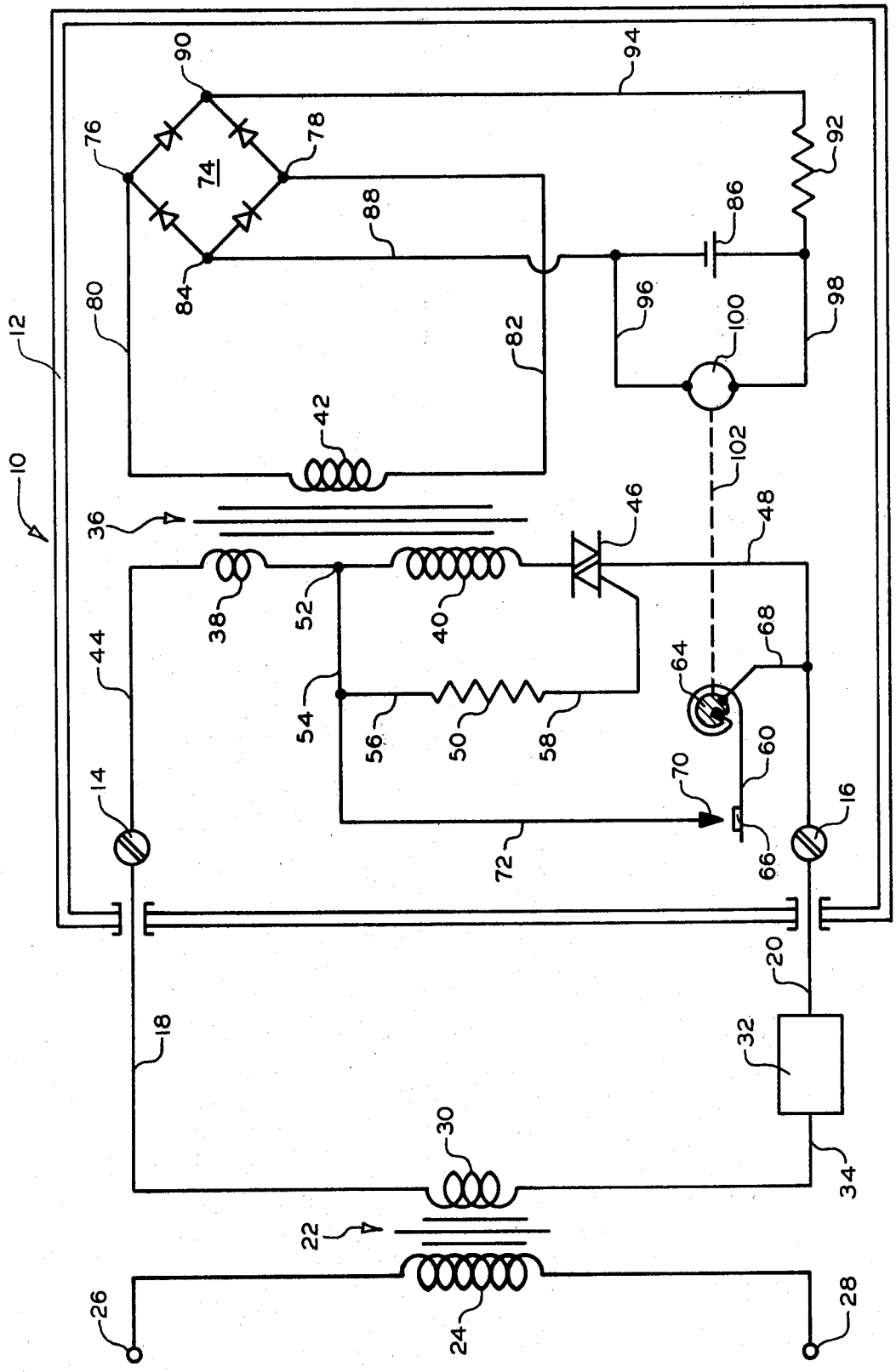

ical timer and circuit means for main-
CHARGING CIRCUIT FOR BATTERY IN THERMOSTAT WITH BATTERY OPERATED TIMER This invention relates generally to timer controlled space thermostats which include a small rechargeable battery for operating the timer and more particularly to circuit means for maintaining a sufficient charge on the battery.

Application Ser. No. 933,217, now U.S. Pat. No. 4,177,923, for "BATTERY OPERATED THERMOSTAT TIMER WITH BATTERY CHARGING CIRCUITS" by Robert C. Krump, assignor to the assignee of the present invention, discloses a timer controlled space thermostat utilizing a rechargeable battery for operating an electrical timer and circuit means for maintaining a charge on the battery. In one embodiment in the referenced application, a current transformer is employed to charge the battery when the thermostat contacts are closed, and a resistor-diode arrangement is employed to charge the battery when the thermostat contacts are open.

A problem arises in the above circuit of the referenced application when a timer having relatively large power requirements is employed. To power a timer having larger power requirements necessitates larger capacity batteries and more battery charging capability. It thus becomes necessary to charge the battery with a higher value of charging current. To insure sufficient charging capability, regardless of the time cycle of the thermostat, it is also necessary to charge the battery with a higher value both when the thermostat contacts are open and closed.

While the current-transformer arrangement in the referenced application can produce a relatively large charging current when the thermostat contacts are closed, a similar large current flow through the resistor-diode arrangement, when the thermostat contacts are open, is not permissible. Specifically, the resistor and diode in the referenced application are electrically in series with electrically operated control means, such as a gas valve solenoid, a relay, or a contactor coil, which controls operation of the space conditioning apparatus. When the thermostat contacts are open, the same current that flows through the resistor and diode also flows through the electrically operated control means. When this current is quite small, as it is in the referenced application, the electrically operated control means is de-energized. That is to say, even though there is still a current flow through the electrically operated control means when the thermostat contacts are open, it is so much smaller than what it is when the thermostat contacts are closed, that it is incapable of maintaining the control means energized. However, if this current flow is increased to provide a higher value of charging current, the electrically operated control means may fail to be de-energized. It is therefore necessary to provide an improved charging circuit for charging the battery when the thermostat contacts are open which provides a relatively large charging current without requiring a correspondingly large current flow through the electrically operated control means which controls the space conditioning apparatus.

An object of this invention is to provide a timer controlled space thermostat including an electrically operated timer, a rechargeable storage battery for operation of the timer, and circuit means including current-transformer means for charging the battery when the thermostat contacts are closed, and circuit means including voltage-transformer means for charging the battery when the thermostat contacts are open.

A further object is to provide a timer controlled space thermostat incorporating within its casing an electrically operated timer, a rechargeable storage battery for operation of the timer, thermostat switching means for connecting remote space conditioning apparatus control means with a remote power source, and circuit means for charging the battery both when the thermostat contacts are open and closed, such circuit means including a transformer having three windings on a single iron core, two of the windings being connected in series with the remote power source, and the third winding being connected in series with the battery.

A further object is to provide a timer controlled space thermostat as in the preceding paragraph wherein one of the two series connected windings is connected in series with the thermostat switching means, and the other of the two series connected windings is connected in parallel with the thermostat switching means.

Other objects and advantages of the invention will become apparent from the following description when read in connection with the accompanying drawing.

The single FIGURE of the drawing is a diagrammatic illustration of a timer controlled space thermostat constructed in accordance with the present invention.

DESCRIPTION OF THE PREFERRED EMBODIMENT

Referring now to the single FIGURE of the drawing, a timer controlled space thermostat is indicated generally at 10. Thermostat 10 includes a casing 12 and terminal screws 14 and 16 secured therein for facilitating connection of thermostat 10 to external leads 18 and 20.

A voltage step-down transformer 22 has its primary winding 24 connected to terminals 26 and 28 of a conventional 120 volt alternating current power source. One side of the secondary winding 30 of transformer 22 is connected by lead 18 to screw terminal 14. An electrically operated control means 32 is connected by a lead 34 to the other side of secondary winding 30 and by lead 20 to screw terminal 16. Electrically operated control means 32, in the illustration, comprises a gas valve solenoid, a relay, or similar electrically operated device for controlling operation of space conditioning apparatus such as a forced-air furnace (not shown). Transformer 22 and control means 32 are generally located remote from thermostat 10 and connecting wires 18 and 20 are routed through a wall of the dwelling.

A miniature transformer 36 in thermostat 10 comprises two primary winding 38 and 40 and a secondary winding 42 wound on a single iron core. Primary windings 38 and 40 are connected in series across screw terminals 14 and 16 through a lead 44, a triac 46, and a lead 48. A gating resistor 50 for triac 46 is connected to a point 52 between windings 38 and 40 and the gate terminal of triac 46 by lead 54, 56, and 58.

A thermostat switching means for controlling energizing of control means 32 includes a bimetallic sensing element 60 secured at one end to a rotatable post 64. The other end of sensing element 60 carries a contact 66. Post 64 is electrically connected to contact 66 through sensing element 60 and to screw terminal 16 through a lead 68 and lead 48. A fixed contact 70, which cooperates with contact 66, is connected to point 52 by a lead 72 and lead 54. Sensing element 60 is coiled about post 64 in such a manner so that contacts 66 and 70 close when the space temperature drops to a temperature commonly known as the temperature set point, and open when the space temperature rises a sufficient amount from the temperature set-point.

A full wave rectifier 74 is connected at points 76 and 78 to secondary winding 42 of transformer 36 by leads 80 and 82, respectively. Rectifier 74 is further connected at a point 84 to one side of a rechargeable storage battery 86 by a lead 88, and at a point 90 to the other side of battery 86 through a current limiting resistor 92 and by a lead 94.

Connected across battery 86 by leads 96 and 98 is an electrically operated timer 100 energizable by a relatively small direct current power source, such as 1¼ to 5 volts. The timer 100 is connected by any suitable mechanical connecting means 102 to post 64. Timer 100 and mechanical connecting means 102 are effective to alternately rotate the post 64 and therefore sensing element 60 in one direction and then the other at selected time intervals so as to periodically change the temperature set point of the thermostat.

OPERATION

The timer controlled space thermostat 10 is shown in the FIGURE in a satisfied condition wherein contacts 66 and 70 are open. As the space temperature decreases, sensing element 66 moves in a clockwise direction about post 64, causing contact 66 to move towards contact 70. Upon a sufficient decrease in space temperatures, contacts 66 and 70 close.

With thermostat contacts 66 and 70 closed, a circuit is completed as follows: from one side of secondary winding 30 of transformer 22, through leads 18 and 44, primary winding 38 of transformer 36, leads 54 and 72, contacts 70 and 66, sensing element 60, post 64, leads 68, 48, and 20, space conditioning apparatus control means 32, and lead 34 to the other side of secondary winding 30. Under these conditions, control means 32 is energized to effect operation of the space conditioning apparatus, such as a furnace.

Also under these conditions, the current flow through primary winding 38 is effective to cause a voltage to be induced in secondary winding 42 of transformer 36. The turns ratio of primary winding 38 to secondary winding 42 is such that the induced voltage in secondary winding 42 is higher than the voltage across primary winding 38, and sufficiently high to effect charging of battery 86.

Also, the current flow in secondary winding 42 is considerably less than the current flow in primary winding 38. Thus, this current-transformer coupling arrangement of primary winding 38 and secondary winding 42 is effective to induce a stepped-up voltage and stepped-down current in secondary winding 42. If the voltage of battery 86 is below its fully charged value, battery 86 is then charged by the induced voltage and resulting current in secondary winding 42, the circuit being: from one side of secondary winding 42, through lead 80, rectifier 74, lead 94, resistor 92, battery 86, lead 88, rectifier 74, and lead 82 to the other side of secondary winding 42. Since rectifier 74 is a full-wave rectifier, current to battery 86 is also provided when the polarity across secondary winding 42 reverses.

Since timer 100 is connected across battery 86 by leads 96 and 98, timer 100 is energized by battery 86 and the current from rectifier 74, battery 86 functioning as a filter. In the event of an electrical power outage, battery 86 is effective to maintain timer 100 energized for a period of time in excess of 24 hours.

The impedance of primary winding 38 is quite low in comparison with the impedance of control means 32 so that very little voltage is dropped across winding 38. Thus, primary winding 38 does not adversely effect operation of control means 32. Also the iron core in transformer 38 is saturated at a low value of current flow through primary winding 38 so that an increased current flow, due, for example, to employment of a control means 32 having lower impedance, will not cause a proportional increase in induced current flow in secondary winding 42. This saturable feature functions to provide a charging current which varies between a value sufficient to charge battery 86 and a value beyond which battery 86 would possibly be damaged because of too high a value of charging current.

When thermostat contacts 66 and 70 open, the above described circuit for energizing control means 32 is broken, causing control means 32, typically a solenoid or a relay controlling a gas valve, to drop out. Opening of contacts 66 and 70 also enables the completion of a high impedance circuit, the circuit being: from one side of secondary winding 30 of transformer 22, through leads 18 and 44, primary winding 38 of transformer 36, leads 54 and 56, resistor 50, lead 58, the gate terminal and a main terminal of triac 46, leads 48 and 20, electrical control means 32, and lead 34 to the other side of secondary winding 30. This circuit causes triac 46 to be gated on, enabling current to flow through primary winding 40 of transformer 36.

The impedance of primary winding 40 of transformer 36 is considerably greater than the impedance of control means 32 so that most of the voltage output of secondary winding 30 of transformer 22 appears across primary winding 40. The high impedance of primary winding 40 also limits the current flow through control means 32 to a sufficiently low value so that control means 32 is not held in by such current flow when contacts 66 and 70 open.

Energizing of primary winding 40 causes an induced voltage in secondary winding 42 of transformer 36. Current to timer 100 and charging current to battery 86 is then supplied by secondary winding 42 via the same circuitry as previously described.

The turns ratio of primary winding 40 to secondary winding 42 is such that the induced voltage in secondary winding 42 is lower than the voltage across primary winding 40 but sufficiently high to effect charging of battery 86. Also, the resulting current flow in secondary winding 42 can be considerably greater than the current flow through primary winding 40, depending on the state of charge of battery 86. Thus the voltage-transformer coupling arrangement, effective when thermostat contacts 66 and 70 are open, provides an induced stepped-down voltage and stepped-up current, thus enabling a relatively high value of charging current, higher than would be permissible if the charging current were to flow through the control means 32.

It should be noted that connecting primary winding 40 through triac 46, instead of directly across thermostat contacts 66 and 70, prevents shorting of secondary winding 40 by contacts 66 and 70, which shorting would negate proper functioning of transformer 36.

The exact component values of the charging circuit will vary, depending, among other factors, on the particular power requirements of the timer and on the battery utilized. We have found that for a timer having a current draw requirement of approximately 8 milliamperes, the following component values enables maintaining a sufficient charge on series connected nickle-cadmium batteries totaling 5 volts d.c.:

| | |
|---|---|
| Primary Winding 38 | 40 turns of No. 25 gauge wire |
| Primary Winding 40 | 2000 turns of No. 40 gauge wire |
| Secondary Winding 42 | 550 turns of No. 40 gauge wire |
| Core of Transformer 36 | Grain-oriented silicon steel |
| Resistor 50 | 25,000 ohms |
| Resistor 92 | 100 ohms |

While timer 100 is effective to rotate post 64 at selected times to effect changing the temperature set point of thermostat 10, it is to be understood that other means of changing the set point can be employed and still enable utilizing the above described charging circuit arrangement. For example, thermostat 10 can employ two thermostat switching means having independently adjustable set points. In such an arrangement, timer 100 would include a double-throw switch for periodically connecting one and then the other of the thermostat switches in series with control means 32. Such a thermostat-timer arrangement is shown in U.S. Pat. No. 4,049,973.

While the foregoing description relates to a thermostat for use in a heating system, it is to be understood that, with some modifications familiar to those skilled in the art, the thermostat could be used in a cooling system or a heating and cooling system.

We claim:

1. An improved battery charging circuit means in a timer controlled space thermostat wherein the timer is connected to a rechargeable battery for continuous operation thereof, wherein the improved charging circuit means comprises:

a transformer including two primary windings and one secondary winding wound on a single iron core;

said secondary winding being connected in circuit with the battery for effecting charging of said battery when energized;

one of said primary windings being of low impedance and connected in series with a thermostat switch of the space thermostat and energized when said thermostat switch is closed to effect energizing of said secondary winding;

the other of said primary windings being of high impedance and connected in parallel with said thermostat switch and energized when said thermostat switch is open to effect energizing of said secondary winding;

controlled solid state switching means connected in series with said other of said primary windings; and gating circuit means for said switching means connected in parallel with said thermostat switch;

said gating circuit means being energized to effect conduction of said switching means only when said thermostat switch is open.

2. In a timer controlled space thermostat, thermostat switching means connected in series with a remote power source and remote space conditioning apparatus control means and effective to control energizing and de-energizing of said control means;

an electrical timer for periodically changing the temperature at which said switching means effects said energizing and de-energizing of said control means;

a rechargable battery connected to said timer;

charging circuit means for continuously charging said battery including a transformer having two primary windings and a secondary winding wound on a single iron core;

said secondary winding being connected in circuit with said battery;

one of said primary windings being connected in series with said switching means and being responsive to energizing thereof, when said switching means effects said energizing of said control means, to induce a stepped-up voltage and a stepped-down current flow in said secondary winding effective to charge said battery;

the other of said primary windings being connected in parallel with said switching means and being responsive to energizing thereof, when said switching means effects said de-energizing of said control means, to induce a stepped-down voltage and a stepped-up current flow in said secondary winding effective to charge said battery; and said transformer being saturated at a low value of current flow through said one of said primary windings when said switching means effects said energizing of said control means.

* * * * *